United States Patent
Yamamoto (10) Patent No.: US 10,766,110 B2
(45) Date of Patent: Sep. 8, 2020

(54) TOOL CHANGER

(71) Applicant: DMG MORI CO., LTD., Nara (JP)

(72) Inventor: Koji Yamamoto, Nara (JP)

(73) Assignee: DMG MORI CO., LTD., Nara (JP)

( * ) Notice: Subject to any disclaimer, the term of this patent is extended or adjusted under 35 U.S.C. 154(b) by 121 days.

(21) Appl. No.: 16/316,575

(22) PCT Filed: May 25, 2017

(86) PCT No.: PCT/JP2017/019542
§ 371 (c)(1),
(2) Date: Jan. 9, 2019

(87) PCT Pub. No.: WO2018/034038
PCT Pub. Date: Feb. 22, 2018

(65) Prior Publication Data
US 2019/0291223 A1 Sep. 26, 2019

(30) Foreign Application Priority Data
Aug. 17, 2016 (JP) .................. 2016-160145

(51) Int. Cl.
*B23Q 3/157* (2006.01)
*B23Q 3/155* (2006.01)

(52) U.S. Cl.
CPC ....... *B23Q 3/1554* (2013.01); *B23Q 3/15722* (2016.11); *B23Q 3/15746* (2013.01);
(Continued)

(58) Field of Classification Search
CPC ............ Y10T 483/12; Y10T 483/123; Y10T 483/127; Y10T 483/13; Y10T 483/132;
(Continued)

(56) References Cited

U.S. PATENT DOCUMENTS 5,876,316 A * 3/1999 Kato ................ B23Q 3/157
483/44
6,090,026 A * 7/2000 Hosokawa ........... B23Q 1/4852
483/36
(Continued)

FOREIGN PATENT DOCUMENTS

EP 2965861 A1 1/2016
JP 05069259 A * 3/1993
(Continued)

*Primary Examiner* — Sunil K Singh
*Assistant Examiner* — Michael Vitale
(74) *Attorney, Agent, or Firm* — Miller, Matthias & Hull LLP (57) ABSTRACT

A tool changer includes a holding member having a tool change arm disposed thereon, a rotation mechanism rotating the holding member at a first rotation speed in normal and reverse directions, a forward/backward movement mechanism moving the holding member forward and backward at a first forward/backward movement speed, and a controller comparing a first difference as a difference between a command value for the rotation and an output value of an encoder with a first threshold. When the first difference is equal to or greater than the first threshold, a rotational speed of the holding member is chained to a second rotation speed slower than the first rotation speed. Alternatively, when the first difference is less than the first threshold, the rotational speed of the holding member is maintained at the first rotation speed.

6 Claims, 6 Drawing Sheets

(52) U.S. Cl.
CPC ............ *B23Q 2003/155418* (2016.11); *B23Q 2003/155428* (2016.11); *B23Q 2003/155439* (2016.11)

(58) Field of Classification Search
CPC ............ Y10T 483/134; Y10T 483/136; Y10T 483/138; Y10T 483/1748; Y10T 483/1752; Y10T 483/1755; Y10T 483/1767; Y10T 483/1769; B23Q 2003/155414; B23Q 2003/155425; B23Q 2003/155428; B23Q 2003/155435; B23Q 2003/155439; B23Q 3/15503; B23Q 3/15713
USPC ........ 483/4, 5, 6, 7, 8, 9, 10, 11, 36, 38, 39, 483/44, 45; 318/280, 282, 283, 286, 445, 318/466, 468, 602, 625
See application file for complete search history.

(56) References Cited

U.S. PATENT DOCUMENTS

| | | | |
|---|---|---|---|
| 2002/0094920 A1* | 7/2002 | Yasumatsuya | G05B 19/182 483/1 |
| 2015/0119215 A1* | 4/2015 | Chen | B23Q 3/15526 483/67 |
| 2015/0367467 A1* | 12/2015 | Chiu | B23Q 3/15713 483/36 |
| 2017/0087679 A1* | 3/2017 | Yamamoto | B23Q 3/1574 |

FOREIGN PATENT DOCUMENTS

| | | |
|---|---|---|
| JP | 084990 Y2 | 2/1996 |
| JP | 2010099799 A | 5/2010 |
| JP | 5965044 B1 | 8/2016 |

\* cited by examiner

TOOL CHANGER

TECHNICAL FIELD

The present invention relates to a tool changer which is disposed at a tool change position in a machine tool and changes a tool attached to a spindle with a next tool positioned at a standby position.

BACKGROUND ART

Various types of tool changers have been known. Currently, a tool changer of so-called double arm type is generally employed. A tool changer of this type is configured to include a holding member disposed to have a center axis parallel to an axis of the spindle and provided to be rotatable about the center axis and movable in a direction along the axis of the spindle, a rotation mechanism rotating the holding member in normal and reverse directions about the center axis, a forward/backward movement mechanism moving the holding member forward and backward in the direction along the axis of the spindle, two tool change arms (i.e., a double arm) disposed on the holding member to extend in a radial direction with respect to the center axis of the holding member such that they form a straight line, each having a tool holding part which is opened to one side surface of the tool change arm in the normal/reverse rotation direction of the holding member, and respectively holding the tools with the tool holding units such that axes of the tools are parallel to the center axis of the tool holding member, and a controller controlling the rotation mechanism and the forward/backward movement mechanism.

Further, it is known that the tool changer as described above includes a hydraulic type using hydraulic pressure as drive sources for the rotation mechanism and the forward/backward movement mechanism, a type using a cam mechanism driven by an AC motor (cam driving type), a type using a servo motor for driving (for example, see Patent Literature 1). The tool changer of hydraulic type was developed in the early stages, and the tool changer of cam driving type was developed thereafter for the purpose of shortening changing time. In recent years, the tool changer of servo motor driving type has been employed because advances in technology for the driving mechanism thereof, such as faster servo motor speed, have enabled a quicker tool change than that using the tool changer of cam driving type.

In the tool changer of servo motor driving type, a servo motor constituting the rotation mechanism (hereinafter, referred to as "rotation servo motor") and a servo motor constituting the forward/backward movement mechanism (hereinafter, referred to as "forward/backward movement servo motor") are controlled by the controller. An angular position of the tool change arms is detected by an encoder attached to the rotation servo motor (hereinafter, referred to as "rotation encoder"), and similarly a forward/backward movement position of the tool change arms is detected by an encoder attached to the forward/backward movement servo motor (hereinafter, referred to as "forward/backward movement encoder").

Specifically, the angular position of the tool change arms is calculated based on current number of revolutions and angle of rotation (i.e., rotational position data) of the rotation servo motor, which are detected as absolute values by the rotation encoder, and a reduction ratio of a transmission mechanism, which transmits a force of the rotation servo motor to the holding member to rotate the holding member, relative to the rotation servo motor. Further, the forward/backward movement position of the tool change arm is calculated based on current number of revolutions and angle of rotation (i.e., rotational position data) of the forward/backward movement servo motor, which are detected as absolute values by the forward/backward movement encoder, and a lead of a ball screw mechanism which transmits a force of the forward/backward movement servo motor to the holding member to move the holding member forward and backward. The tool change arms are controlled by the controller; rotation thereof is controlled based on the rotational position data of the rotation servo motor detected as described above and a rotation zero point that is set as appropriate based on the rotational position data of the rotation servo motor, and forward/backward movement thereof is controlled based on the rotational position data of the forward/backward movement servo motor and a forward/backward movement zero point that is set as appropriate based on the rotational position data of the forward/backward movement servo motor.

CITATION LIST

Patent Literature

Patent Literature 1: Japanese Examined Utility Model Application Publication No. H8-4990

SUMMARY OF INVENTION

Technical Problem

By the way, lubricant is used in gears or the like transmitting a driving force produced by the rotation servo motor to the tool change arms. When the temperature of the lubricant is decreased, the viscosity of the lubricant is decreased and the frictional resistance of meshing of the gears is increased, which increases the load on the rotation servo motor. Consequently, the conventional tool changer of servo motor driving type produces follow-up delay with respect to a set speed that is a control target. That is, when it is desired to rotate the tool change arms at a certain speed, the tool change arms can be rotated only at a speed slower than the certain speed. Accordingly, when it is desired to synchronize rotation of the tool change arms and forward/backward movement of the tool change arms (for example, when the tool change arms are to be moved forward or backward during rotation of the tool change arm, or the like), there occurs a situation in which forward/backward movement of the tool change arms is started at an unintended timing during rotation of the tool change arms. This might cause the tool change arms to move to an unintended position and interfere with another structure.

The present invention has been achieved in view of the above-described circumstances, and an object thereof is to provide a tool changer which is capable of preventing follow-up delay of a tool change arm.

Solution to Problem

The tool changer according to the present invention is a tool changer which is disposed at a tool change position in a machine tool and changes a tool attached to a spindle with a next tool positioned at a standby position, the tool changer including:

a holding member disposed to have a center axis parallel to an axis of the spindle, and provided to be rotatable about the center axis and movable in a direction along the axis of the spindle;

a rotation mechanism including a rotation servo motor and rotating the holding member at a first rotation speed in normal and reverse directions about the center axis, the rotation servo motor having an encoder;

a forward/backward movement mechanism including a forward/backward movement servo motor and moving the holding member forward and backward at a first forward/backward movement speed in the direction along the axis of the spindle, the forward/backward movement servo motor having an encoder;

at least one tool change arm disposed on the holding member to extend in a radial direction of the holding member and holding the tools such that axes of the tools are parallel to the center axis of the holding member;

a storage having a first threshold previously stored therein; and a controller calculating a first difference as a difference between a command value for the rotation servo motor and an output value of the encoder of the rotation servo motor and comparing the first difference with the first threshold, in a case where the first difference is equal to or greater than the first threshold, changing a rotational speed of the holding member rotated by the rotation mechanism to a second rotation speed slower than the first rotation speed, and in a case where the first difference is less than the first threshold, maintaining the rotational speed of the holding member rotated by the rotation mechanism at the first rotation speed.

In the tool changer according to the present invention, the rotation mechanism and the forward/backward movement mechanism are controlled by the controller, and rotation of the tool change arm and forward/backward movement of the tool change arm are performed with driving forces of the rotation mechanism and forward/backward movement mechanism. Under the initial setting, the rotation mechanism is rotated at the first rotation speed and the forward/backward movement mechanism is moved forward and backward at the first forward/backward movement speed. Note that the controller is configured to recognize a number of revolutions (i.e., rotational speed) of the rotation servo motor based on an output signal from the encoder of the rotation servo motor and recognize a number of revolutions (i.e., rotational speed) of the forward/backward movement servo motor based on an output signal from the encoder of the forward/backward movement servo motor. In this configuration, the tool attached to the spindle is changed with the next tool (that is, a tool to be used next) positioned at the standby position by rotation and forward/backward movement of the tool change arm.

In this configuration, the controller calculates the first difference that is a difference between a command value for the rotation servo motor and an output value of the encoder of the rotation servo motor, and compares the calculated first difference with the first threshold. In the case where the first difference is equal to or greater than the first threshold as a result of the comparison, the controller controls operation of the rotation servo motor so that the rotational speed of the holding member (i.e., the rotational speed of the rotation servo motor) becomes the second rotation speed that is slower than the first rotation speed. On the other hand, in the case where the first difference is less than the first threshold as a result of the comparison, the controller controls the operation of the rotation servo motor so that the rotational speed of the holding member (i.e., the rotational speed of the rotation servo motor) is maintained at the first rotation speed. Note that the second rotation speed is a speed which enables synchronizing rotation of the tool change arm and forward/backward movement of the tool change arm, that is, a speed which does not produce follow-up delay in rotation of the tool change arm.

As described above, in the case where the first difference is equal to or greater than the first threshold (that is, in a case where an increase in a load on the rotation servo motor is expected), the rotational speed of the rotation servo motor is reduced to the second rotation speed. Therefore, follow-up delay with respect to a set speed as a control target does not occur in rotation of the tool change arm. Accordingly, there occurs no situation in which forward/backward movement of the tool change arm is started at an unintended timing during rotation of the tool change arm. Hence, the tool change arm never moves to an unintended position and therefore never interferes with another structure. On the other hand, in the case where the first difference is less than the first threshold (that is, in a case where an increase in the load on the rotation servo motor is not expected), the rotational speed of the rotation servo motor is maintained at the first rotation speed. Therefore, processing efficiency of the change performed by the tool change arm can be maintained.

In the present invention, it is preferable that the first difference is calculated when an initial one of rotations of the tool change arm in a tool change operation is performed.

With this configuration, since the first difference is obtained when an initial one of rotations of the tool change arm is performed, occurrence of follow-up delay in the rotations of the tool change arm can be prevented at an early stage.

In the present invention, a configuration is possible in which the storage is configured to have a second threshold previously stored therein, and the controller is configured to calculate a second difference as a difference between a command value for the forward/backward movement servo motor and an output value of the encoder of the forward/backward movement servo motor and compare the second difference with the second threshold, in a case where the second difference is equal to or greater than the second threshold, change a forward/backward moving speed of the holding member moved by the forward/backward movement mechanism to a second forward/backward movement speed slower than the first forward/backward movement speed, and in a case where the second difference is less than the second threshold, maintain the forward/backward moving speed of the holding member moved by the forward/backward movement mechanism at the first forward/backward movement speed.

With this configuration, the controller calculates the second difference that is a difference between a command value for the forward/backward movement servo motor and an output value of the encoder of the forward/backward movement servo motor, and compares the calculated second difference with the second threshold. In the case where the second difference is equal to or greater than the second threshold as a result of the comparison, the controller controls operation of the forward/backward movement servo motor so that the forward/backward moving speed of the holding member (i.e., the rotational speed of the forward/backward movement servo motor) becomes the second forward/backward movement speed that is slower than the first forward/backward movement speed. On the other hand, in the case where the second difference is less than the second threshold as a result of the comparison, the controller controls the operation of the forward/backward movement servo motor so that the forward/backward movement speed of the holding member (i.e., the rotational speed of the forward/backward movement servo motor) is maintained at the first forward/backward movement speed. Note that the second forward/backward movement speed is a speed which enables synchronizing forward/backward movement of the tool change arm and rotation of the tool change arm, that is, a speed which does not produce follow-up delay in forward/backward movement of the tool change arm.

As described above, in the case where the second difference is equal to or greater than the second threshold (that is, in a case where an increase in a load on the forward/backward movement servo motor is expected), the rotational speed of the forward/backward movement servo motor is reduced to the second forward/backward movement speed. Therefore, follow-up delay with respect to a set speed as a control target does not occur in forward/backward movement of the tool change arm. Accordingly, there occurs no situation in which rotation of the tool change arm is started at an unintended timing during forward/backward movement of the tool change arm. Hence, the tool change arm never moves to an unintended position and therefore never interferes with another structure. On the other hand, in the case where the second difference is less than the second threshold (that is, in a case where an increase in the load on the forward/backward movement servo motor is not expected), the rotational speed of the forward/backward movement servo motor is maintained at the first forward/backward movement speed. Therefore, processing efficiency of the change performed by the tool change arm can be maintained.

In the present invention, it is preferable that the second difference is calculated when an initial one of forward/backward movements of the tool change arm in a tool change operation is performed.

With this configuration, since the second difference is obtained when an initial one of forward/backward movements of the tool change arm is performed, occurrence of follow-up delay in the forward/backward movements of the tool change arm can be prevented at an early stage.

Advantageous Effects of Invention

As described above, the tool changer according to the present invention can provide a tool changer which is capable of suppressing follow-up delay of a tool change arm.

DESCRIPTION OF EMBODIMENTS

Figure 1:
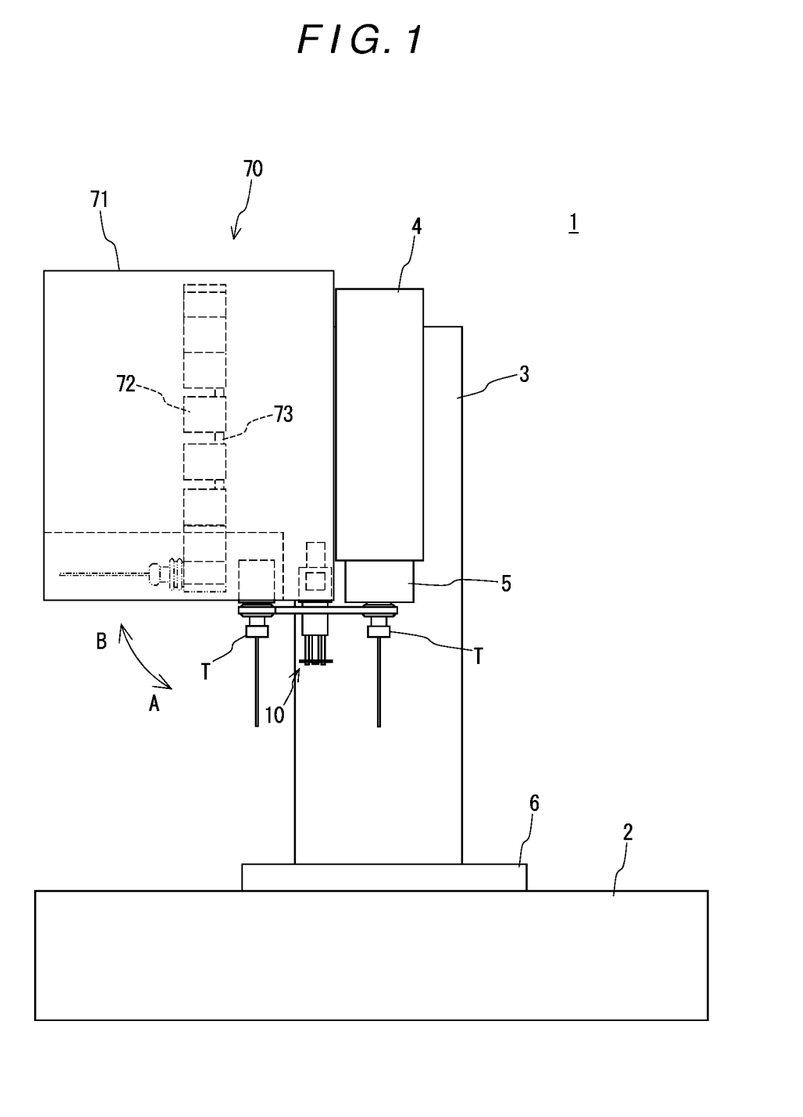
FIG. 1 is a front view of a machine tool according to an embodiment of the present invention.

Hereinafter, a tool changer according to an embodiment of the present invention will be described with reference to the drawings. As shown in FIG. 1, the tool changer 10 according to this embodiment is attached to a machine tool 1, and the machine tool 1 has a tool magazine 70 provided thereon.

[Summary of Machine Tool]

The machine tool 1 shown in FIG. 1 is of a known conventional type and therefore does not need to be explained in detail; however, a brief description of the configuration thereof is provided here. The machine tool 1 includes a bed 2, a column 3 erected on the bed 2, a spindle head 4 disposed on the column 3 to be movable in a vertical direction, a spindle 5 rotatably supported by the spindle head 4, and a table 6 disposed on the bed 2 to be movable in directions of two orthogonal horizontal axes and provided for placing or fixing an appropriate workpiece thereon.

The spindle head 4 is configured to be moved in the vertical direction by an appropriate feed apparatus (not shown), and similarly the table 6 is configured to be moved in the directions of the two orthogonal horizontal axes by an appropriate feed apparatus (not shown). Further, the spindle 5 is configured to be rotated about an axis thereof by an appropriate spindle motor (not shown). Operation of the feed apparatus moving the spindle head 4, operation of the feed apparatus moving the table 6, and operation of the spindle motor driving the spindle 5 are controlled by a controller, which is not shown in the drawings.

[Summary of Tool Magazine]

The tool magazine 70 includes a plurality of tool pots 72 each holding a tool T, a holding plate 73 composed of a circular plate member and holding the tool pots 72 with the tool pots 72 being annularly arranged on a peripheral portion of the holding plate 73, a drive motor (not shown) rotating the holding plate 73, and a calling mechanism (not shown) moving a tool pot 72 positioned at a lower end position in the arrow A direction to position it at a standby position and moving a tool pot 72 positioned at the standby position in the arrow B direction to cause it to be held by the holding plate 73. Note that reference numeral 71 in FIG. 1 indicates a cover. Operation of the tool magazine 70 is also controlled by the aforementioned controller that is not shown in the drawings.

[Tool Changer]

Figure 2:
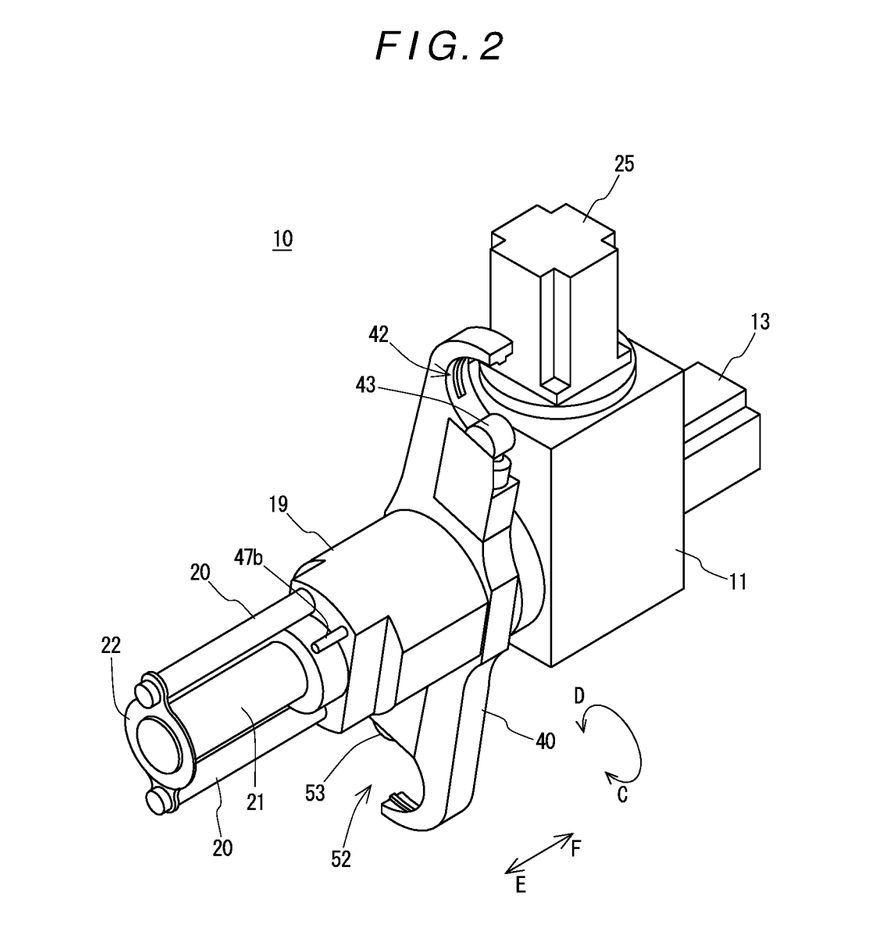
FIG. 2 is a perspective view of a tool changer shown in FIG. 1, viewed from obliquely below.
Figure 3:
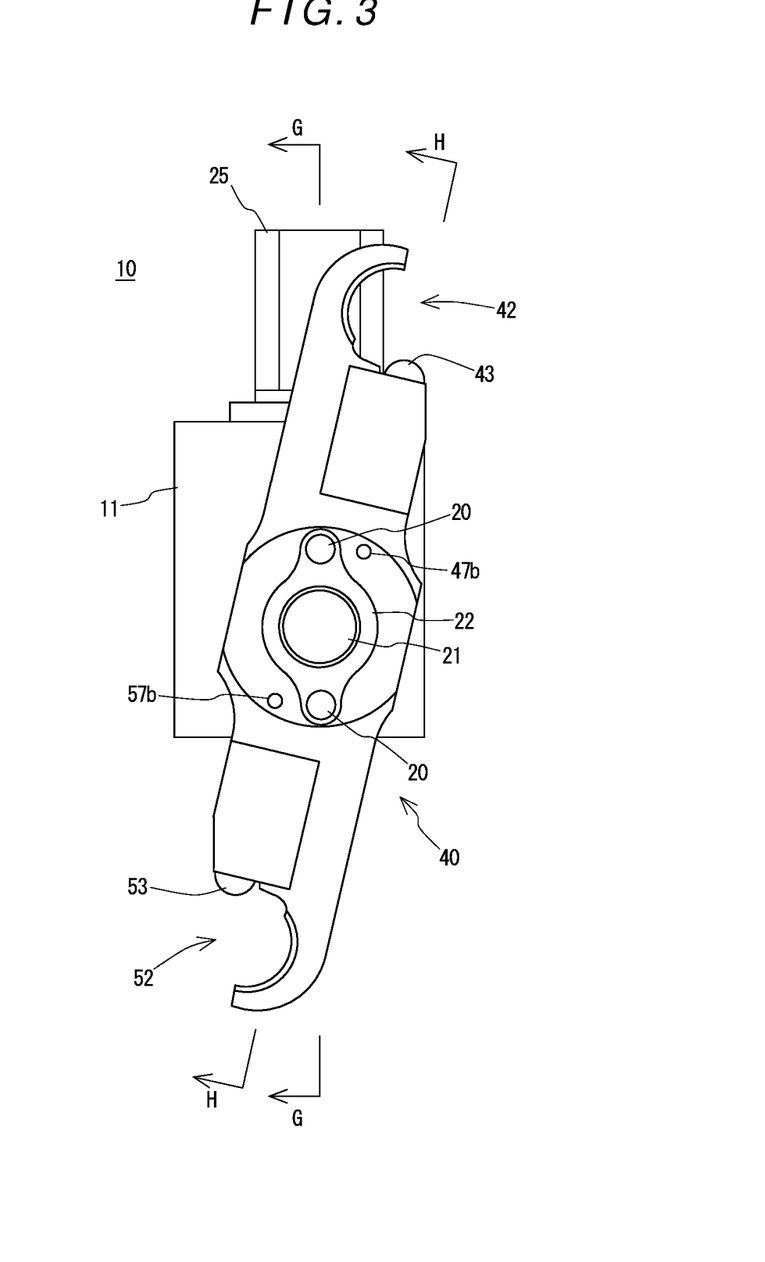
FIG. 3 is a bottom view of the tool changer shown in FIG. 1.

The tool changer 10 changes a tool (current tool) T attached to the spindle 5 with a tool (next tool) T held by a tool pot 72 positioned at the standby position. The tool changer 10 is configured to include a tool change arm 40, a housing 11, a first support shaft 17, a second support shaft 18, a forward/backward movement mechanism 12, and a rotation mechanism 24, which are shown in FIGS. 2 to 4, as well as a controller 60 (see FIG. 6), which will be described later.

The housing 11 is composed of a prism-shaped member having a containing chamber therein, and has the first support shaft 17, the forward/backward movement mechanism 12, and the rotation mechanism 24 attached thereto. As shown in FIG. 4, the first support shaft 17 is attached to the housing 11 such that it vertically penetrates the housing 11, and is connected to the second support shaft 18 that is coaxially arranged below the first support shaft 17. Note that the explanation of FIGS. 2 to 5 given below is based on the vertical positional relation in FIG. 1.

Figure 4:
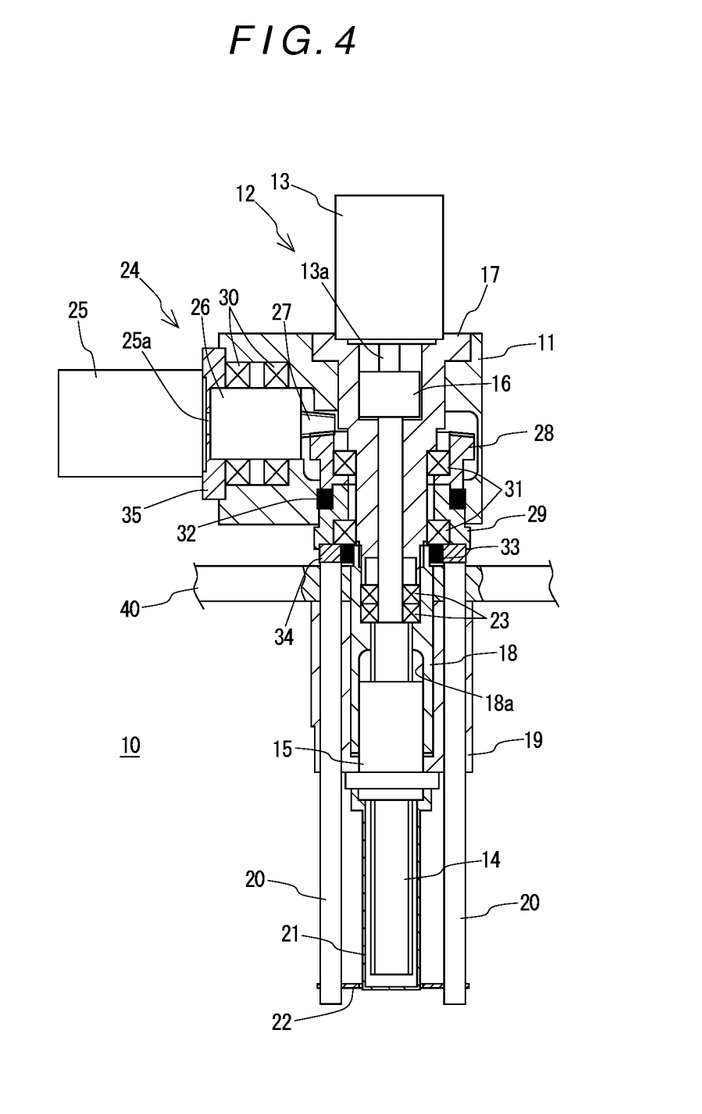
FIG. 4 is a sectional view taken along line G-G in FIG. 3.

As shown in FIG. 4, the forward/backward movement mechanism 12 includes a forward/backward movement servo motor 13 fixed to an upper end of the first support shaft 17, a ball screw 14 connected to an output shaft 13a of the forward/backward movement servo motor 13 via a coupling 16, and a ball nut 15 screwed with the ball screw 14, operation of the forward/backward movement servo motor 13 being controlled by the controller 60. The forward/backward movement servo motor 13 has an encoder 13b (see FIG. 6) attached thereto. The ball screw 14 is inserted in through holes formed in the first support shaft 17 and the second support shaft 18 and extending along axes of the first and second support shafts 17, 18, and is rotatably supported by bearings 23, 23 disposed in the though hole of the second support shaft 18. Further, the ball screw 14 is connected at an upper end thereof to the output shaft 13a via the coupling 16. The second support shaft 18 has a containing hole 18a formed therein which is opened to a lower end surface of the second support shaft 18, and the ball nut 15 has an upper portion able to enter the containing hole 18a.

The tool change arm 40 is fitted on an upper end of the second support shaft 18 with the second support shaft 18 penetrating the tool change arm 40. A holding member 19 fitted on the second support shaft 18 is disposed under the tool change arm 40. The holding member 19 is joined at an upper end thereof to a lower surface of the tool change arm 40. The ball nut 15 is joined to a lower surface of the holding member 19 in a state of being contained in the containing hole 18a. As described above, the upper portion of the ball nut 15 is able to enter the containing hole 18a. The ball nut 15 has a cylindrical cover 21 fixed to a lower portion thereof, which covers the ball screw 14.

In this configuration, when the forward/backward movement servo motor 13 is driven by the controller 60 to rotate the ball screw 14 connected to the output shaft 13a in a normal direction or a reserve direction, the ball nut 15 screwed with the ball screw 14, the holding member 19 and cover 21 connected to the ball nut 15, and the tool change arm 40 connected to the holding member 19 move forward or backward in the arrow E-F direction shown in FIG. 2 along an axis of the ball screw 14. Note that the arrow E direction is the forward movement direction and the arrow F direction is the backward movement direction, and FIGS. 2 to 4 show a state where the ball nut 15, the holding member 19, the cover 21, and the tool change arm 40 are positioned at a zero point position in the forward/backward movement direction (forward/backward movement zero point).

The rotation mechanism 24 includes a rotation servo motor 25, a coupling 26, a first bevel gear 27, a second bevel gear 28, a connecting body 29, a connecting ring 34, and two guide bars 20, operation of the rotation servo motor 25 being controlled by the controller 60. The rotation servo motor 25 is attached to a side surface of the housing 11 via an attaching ring 35. The rotation servo motor 25 has an encoder 25b (see FIG. 6) attached thereto. The first bevel gear 27 is disposed in the containing chamber of the housing 11 such that an axis of the first bevel gear 27 is perpendicular to the axis of the first support shaft 17, and is connected to an output shaft 25a of the rotation servo motor 25 via the coupling 26. Note that the coupling 26 is rotatably supported by bearings 30, 30 disposed in the containing chamber of the housing 11.

The second bevel gear 28 and the connecting body 29 disposed below the second bevel gear 28 are coaxially connected to each other and are fitted on the first support shaft 17 via bearings 31, 31. The second bevel gear 28 meshes with the first bevel gear 27. Further, the connecting body 29 has the connecting ring 34 fixed to a lower end surface thereof, and the connecting ring 34 has the two guide bars 20, 20 fixed to a lower end surface thereof. The guide bars 20, 20 are arranged in parallel to each other to extend in a state of vertically penetrating the tool change arm 40 and the holding member 19. The guide bars 20, 20 serve not only to rotate the tool change arm 40 but also to guide the forward/backward movement of the holding member 19 holding the tool change arm 40 in the arrow E-F direction. Note that the guide bars 20, 20 have a connecting plate 22 fixed to lower ends thereof.

The connecting plate 22 has a through hole formed therein, which is not shown in the drawings, and the cover 21 is able to be inserted in the through hole. Further, a seal 32 is disposed between an outer peripheral surface of the connecting body 29 and an inner peripheral surface of the housing 11 corresponding thereto; the seal 32 provides sealing between the connecting body 29 and the housing 11. Similarly, a seal 33 is disposed between an outer peripheral surface of the second support shaft 18 and an inner peripheral surface of the connecting ring 34; the seal 33 provides sealing between the second support shaft 18 and the connecting ring 34.

In this configuration, when the rotation servo motor 25 is driven by the controller 60 to rotate the first bevel gear 27 connected to the output shaft 25a in a normal direction or a reverse direction, the second bevel gear 28, the connecting body 29, connecting ring 34, guide bars 20, 20, and connecting plate 22 directly or indirectly connected to the second bevel gear 28, the tool change arm 40 and holding member 19, and the ball nut 15 and cover 21 directly or indirectly connected to the holding member 19 rotate in the arrow C-D direction shown in FIG. 2 about the axes of the first support shaft 17 and second support shaft 18. Note that the arrow C direction is a normal rotation direction and the arrow D direction is a reverse rotation direction. FIGS. 2 and 3 show a state where the tool change arm 40 is positioned at a zero point position in the rotation direction (rotation zero point).

Figure 5:
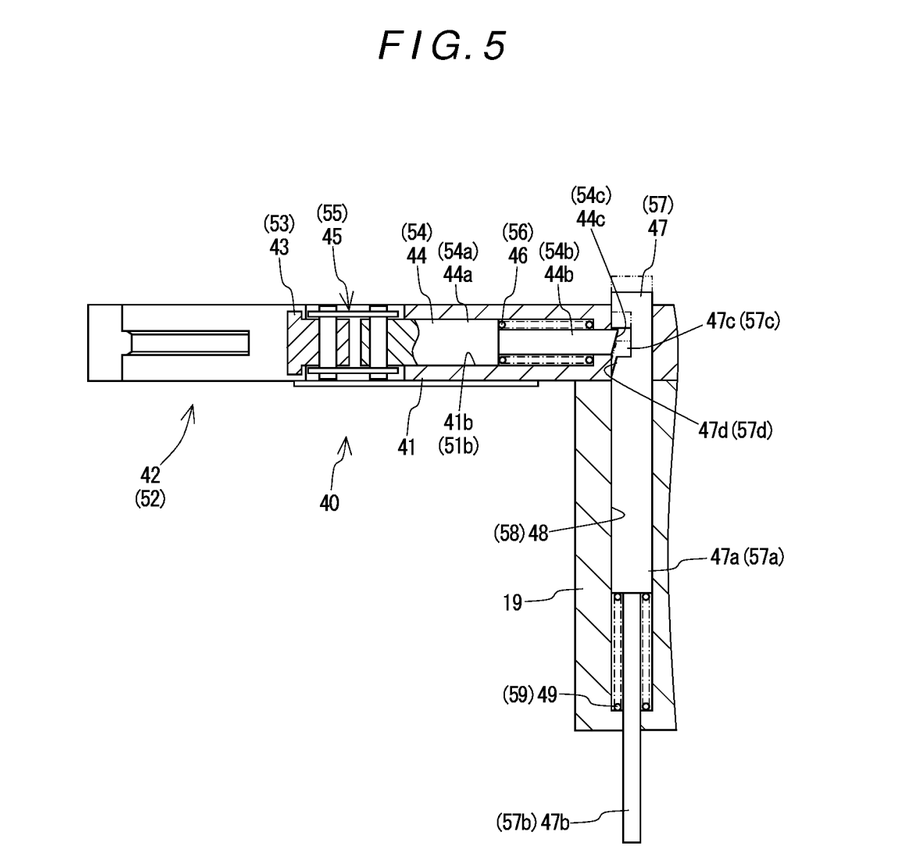
FIG. 5 is a partial sectional view taken along line H-H in FIG. 3.

As shown in FIG. 5, the tool change arm 40 is composed of a plate member 41 and has tool holding parts 42, 52 respectively formed on both ends thereof, the tool holding parts 42, 52 each holding a tool T. The tool holding parts 42, 52 each have an arc shape having an open side (opening) on a side facing in one rotation direction (the normal rotation direction) and can receive a tool T through the open side. Note that the tool change arm 40 is, as described above, fitted on the second support shaft 18 and has an arm portion (not shown) having the tool holding part 42 thereon and extending in one radial direction and an arm portion (not shown) having the tool holding part 52 thereon and extending in the other radial direction.

As shown in FIGS. 3 and 5, each of the tool holding parts 42, 52 has a holding jaw 43, 53 provided thereon which advances and retracts with respect to a holding space of the tool holding part 42, 52. The holding jaw 43, 53 is connected to a biasing rod 44, 54 via a link 45, 55. The biasing rod 44, 54 is a stepped rod consisting of a large diameter portion 44a, 54a and a small diameter portion 44b, 54b, and is inserted in a guide hole 41b, 51b formed in the tool change arm 40, with the small diameter portion 44b, 54b first. Between an end surface of the large diameter portion 44a, 54a and a bottom of the guide hole 41b, 51b, a compressed coil spring 46, 56 is provided in a state of being fitted on the small diameter portion 44b, 54b. The biasing rod 44, 54 is biased toward the tool holding part 42, 52 side by the compressed coil spring 46, 56; accordingly, the holding jaw 43, 53 is also biased in a direction advancing toward the holding space.

In this configuration, when a tool T is inserted into the tool holding part 42, 52, the holding jaw 43, 53 is brought into contact with an outer peripheral surface of the tool T and thereby retracted. Thereby, the tool T is received in the holding space of the tool holding part 42, 52 and is gripped by the tool holding part 42, 52 with a biasing force of the compressed coil spring 46, 56. On the other hand, when the tool T is pulled out of the tool holding part 42, 52, the holding jaw 43, 53 is moved in reverse.

The holding member 19 and the tool change arm 40 have guide holes 48, 58 formed therein, the guide holes 48, 58 being respectively formed to be perpendicular to axes of the guide holes 41b, 51b. Each of the guide holes 48, 58 has a lock rod 47, 57 inserted therein. The lock rod 47, 57 is a stepped rod constituting a large diameter portion 47a, 57a located on the upper side, and a small diameter portion 47b, 57b located on the lower side. The lock rod 47, 57 is inserted in the guide hole 48, 58 such that the small diameter portion 47b, 57b extends outward through a lower end of the holding member 19 and an upper end of the large diameter portion 47a, 57a protrudes upward from the tool change arm 40. Between an end surface of the large diameter portion 47a, 57a and a bottom of the guide hole 48, 58, a compressed coil spring 49, 59 is provided in a state of being fitted on the small diameter portion 47b, 57b. The lock rod 47, 57 is biased upward by the compressed coil spring 49, 59.

The lock rod 47, 57 has an escape hole 47c, 57c formed in the large diameter portion 47a, 57a at a portion intersecting with an axis of the biasing rod 44, 54, and has an inclined surface 47d, 57d formed below the escape hole 47c, 57c, the inclined surface 47d, 57d descending toward the escape hole 47c, 57c. Further, an end of the small diameter portion 44b, 54b of the biasing rod 44, 54 penetrates the bottom of the guide hole 48, 58 and is engaged with the escape hole 47c, 57c of the biasing rod 44, 54, and an end surface 44c, 54c of the small diameter portion 44b, 54b of the biasing rod 44, 54 is an inclined surface having an inclination angle equal to that of the inclined surface 47d, 57d.

In this configuration, in a normal state, the lock rods 47, 57 are biased upward by the compressed coil springs 49, 59 and the inclined surfaces 47d, 57d of the lock rods 47, 57 are, as indicated by a dashed and double-dotted line in FIG. 5, in contact with the end surfaces 44c, 54c of the lock rods 47, 57, thereby restraining, that is, locking retraction of the biasing rods 44, 54. On the other hand, when the lock rods 47, 57 move downward due to an external force against biasing forces of the compressed coil springs 49, 59 and the escape holes 47c, 57c reach positions corresponding to lower ends of the biasing rods 44, 54, the biasing rods 44, 54 become retractable, and therefore tools T can be attached to or detached from the tool holding parts 42, 52.

Note that the tool changer 10 according to this embodiment is configured such that, in FIG. 4, when the tool change arm 40 and the holding member 19 are positioned at the forward/backward movement zero point, the upper ends of the lock rods 47, 57 are brought into contact with the lower end surface of the connecting ring 34 and thereby the lock rods 47, 57 are moved downward, so that the escape holes 47c, 57c correspond to the ends of the biasing rods 44, 54. Therefore, tools T can be attached to or detached from the tool holding parts 42, 52 when the tool change arm 40 and the holding member 19 are positioned at the forward/backward movement zero point. When the tool change arm 40 and the holding member 19 are moved downward, retraction of the biasing rods 44, 54 is restrained, that is to say, tools T being gripped by the holding jaws 43, 53 are locked.

Figure 6:
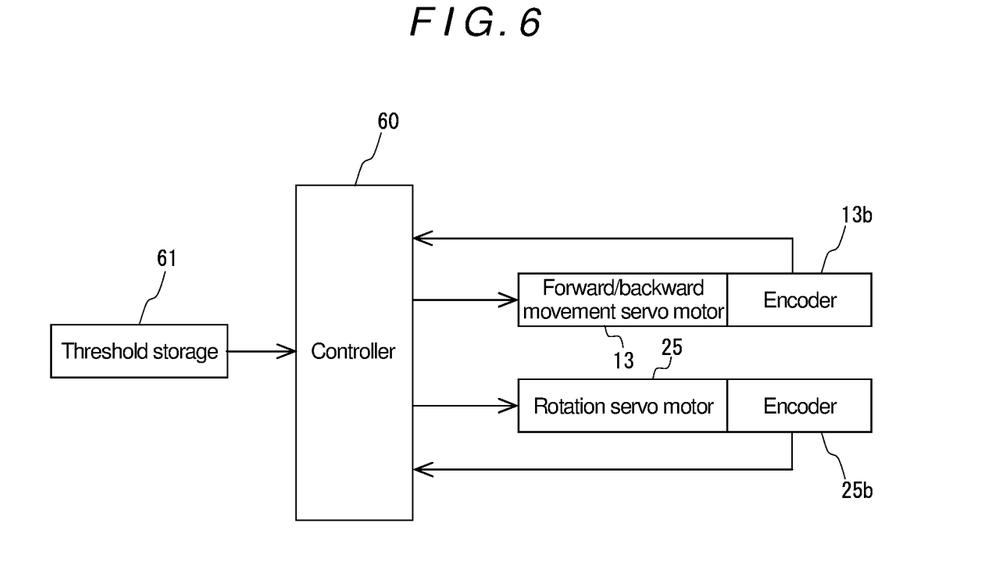
FIG. 6 is a block diagram showing a control system in the embodiment of the present invention.

FIG. 6 is a block diagram showing a control system including the controller 60 in this embodiment. As shown in FIG. 6, the tool changer 10 according to this embodiment further includes a threshold storage 61, which may be constituted by various types of memories or the like. The threshold storage 61 has a first threshold and a second threshold, which will be described later, previously stored therein. The controller 60 is constituted by a computer including a CPU, an RAM, and an ROM, and controls a number of revolutions of the forward/backward movement servo motor 13 and a number of revolutions of the rotation servo motor 25 in accordance with an appropriate tool change program or the like. In this case, the position in the E-F direction (see FIG. 2) (forward/backward movement position) of the tool change arm 40 is recognized based on output values of the encoder 13b of the forward/backward movement servo motor 13, i.e., based on current rotational position data of the forward/backward movement servo motor 13. The encoder 13b outputs absolute values of current number of revolutions and angle of rotation (rotational position data) of the forward/backward movement servo motor 13, and stores the rotational position data in a memory incorporated therein. Note that the aforementioned forward/backward movement zero point is a position such that rotating the tool change arm 40 allows a tool T attached to the spindle 5 positioned at a tool change position to be held by either of the tool holding parts 42, 52; rotational position data output from the encoder 13b at this position is stored as the forward/backward movement zero point in a storage, which is not shown in the drawings. In the controller 60, a current position with respect to the forward/backward movement zero point is recognized based on a difference between the rotational position data at the forward/backward movement zero point and the current rotational position data, as well as a lead of the ball screw 14.

On the other hand, the position in the C-D direction (see FIG. 2) (angular position) of the tool change arm 40 is recognized based on output values of the encoder 25b of the rotation servo motor 25, i.e., based on current rotational position data of the rotation servo motor 25. The encoder 25b outputs absolute values of current number of revolutions and angle of rotation (rotational position data) of the rotation servo motor 25, and stores the rotational position data in a memory incorporated therein. Note that the aforementioned rotation zero point is an angular position set as appropriate in design, at which the tool change arm 40 does not interfere with another structure when the tool change arm 40 is moved forward or backward in the E-F direction. Rotational position data output from the encoder 25b when the tool change arm 40 is positioned at this angular position is stored as the rotation zero point in a storage, which is not shown in the drawings.

Hereinafter, a tool change operation will be described. Note that, in the description below, as shown in FIG. 1, the spindle 5 is positioned at a position for tool change (tool change position), the next tool T is positioned at the standby position, and the tool change arm 40 is, as shown in FIGS. 2 and 3, positioned at the forward/backward movement zero point and at the rotation zero point. Further, the description given below refers to a rotational speed of the holding member 19 rotated by the rotation servo motor 25 (i.e., the rotational speed of the rotation servo motor 25) under the initial setting as "first rotation speed", and a forward/backward moving speed of the holding member 19 moved by the forward/backward movement servo motor 13 (i.e., the rotational speed of the forward/backward movement servo motor 13) under the initial setting as "first forward/backward movement speed".

In the tool change operation described below, rotation of the holding member 19 and forward/backward movement of the holding member 19 may be performed in parallel such that they partially overlap. Alternatively, forward/backward movement may be started at the time of completion of rotation with rotation being started at the time of completion of forward/backward movement. In either case, the tool changer 10 according to this embodiment produces no follow-up delay as described above. Note that the description below describes the case where forward/backward movement is started at the time of completion of rotation and rotation is started at the time of completion of forward/backward movement.

First, the controller 60 drives the rotation servo motor 25 to execute a swinging operation in which the tool change arm 40 is rotated in the arrow C direction shown in FIG. 2 (the normal rotation direction) about the axes of the first support shaft 17 and second support shaft 18. This swinging operation causes the tool T attached to the spindle 5 (i.e., the current tool) to be held by the tool holding part 42 and the tool T positioned at the standby position (i.e., the next tool) to be held by the tool holding part 52. During the execution of this swinging operation, the controller 60 calculates a first difference, which is a difference between a command value for the rotation servo motor 25 and an output value of the encoder 25b of the rotation servo motor 25, at predetermined time intervals, and compares the first difference with the first threshold stored in the threshold storage 61. In a case where the first difference is equal to or greater than the first threshold as a result of the comparison (that is, in a case where an increase in a load on the rotation servo motor 25 is expected), the controller 60 controls rotation of the rotation servo motor 25 so that thereafter the rotational speed of the rotation servo motor 25 is at a second rotation speed that is slower than the first rotation speed. The second rotation speed is, for example, about 50% of the first rotation speed. On the other hand, in a case where the first difference is less than the first threshold (that is, in a case where an increase in the load on the rotation servo motor 25 is not expected), the controller 60 controls the rotation of the rotation servo motor 25 so that thereafter the rotational speed of the rotation servo motor 25 is maintained at the first rotation speed.

Subsequently, the controller 60 drives the forward/backward movement servo motor 13 to move the tool change arm 40 forward to a forward end, which is located at a lower position, along the first support shaft 17 and the second support shaft 18. This forward movement causes the tool (current tool) T to be pulled out of the spindle 5 and the tool (next tool) T to be pulled out of a tool pot 72 positioned at the standby position. During this forward movement of the tool change arm 40, the controller 60 calculates a second difference, which is a difference between a command value for the forward/backward movement servo motor 13 and an output value of the encoder 13b of the forward/backward movement servo motor 13, at predetermined time intervals, and compares the second difference with the second threshold stored in the threshold storage 61. In a case where the second difference is equal to or greater than the second threshold as a result of the comparison (that is, in a case where an increase in a load on the forward/backward movement servo motor 13 is expected), the controller 60 controls rotation of the forward/backward movement servo motor 13 such that thereafter the rotational speed of the forward/backward movement servo motor 13 is at a second forward/backward movement speed that is slower than the first forward/backward movement speed. The second forward/backward movement speed is, for example, about 50% of the first forward/backward movement speed. On the other hand, in a case where the second difference is less than the second threshold (that is, in a case where an increase in the load on the forward/backward movement servo motor 13 is not expected), the controller 60 controls the rotation of the forward/backward movement servo motor 13 such that thereafter the forward/backward moving speed of the forward/backward movement servo motor 13 is maintained at the first forward/backward movement speed. Further, after the tool change arm 40 is moved forward as described above, because the downward movement of the tool change arm 40 causes the lock rods 47, 57 to be moved upward by the biasing forces of the compressed coil springs 49, 59, the gripping of the tools T by the holding jaws 43, 53 is locked.

Subsequently, the controller 60 drives the rotation servo motor 25 to rotate the tool change arm 40 180 degrees in the arrow C direction (the normal rotation direction) about the axes of the first support shaft 17 and second support shaft 18. This rotation causes the tool (next tool) T held by the tool holding part 52 to be coaxially positioned directly below the spindle 5 and the tool (current tool) T held by the tool holding part 42 to be positioned directly below the tool pot 72 positioned at the standby position.

Subsequently, the controller 60 drives the forward/backward movement servo motor 13 to move the tool change arm 40 backward to the forward/backward movement zero point, which is located at an upper position, along the first support shaft 17 and the second support shaft 18. This backward movement causes the tool (next tool) T to be attached to the spindle 5 and the tool (current tool) T to be attached to the tool pot 72 positioned at the standby position. Further, the movement of the tool change arm 40 to a backward end moves the lock rods 47, 57 downward, which releases the lock of the gripping by the holding jaws 43, 53 and thereby allows the tools T to be detached from the tool holding parts 42, 52.

Finally, the controller 60 drives the rotation servo motor 25 to rotate the tool change arm 40 in the arrow D direction (the reverse rotation direction) about the axes of the first support shaft 17 and second support shaft 18, thereby returning the tool change arm 40 to the rotation zero point. After the above-described operations, the controller 60 ends the tool change operation.

As described above, in the tool changer 10 according to this embodiment, in the case where the first difference, which is a difference between a command value for the rotation servo motor 25 and an output value of the encoder 25b of the rotation servo motor 25, is equal to or greater than the first threshold (that is, in the case where an increase in the load on the rotation servo motor 25 is expected), the rotational speed of the rotation servo motor 25 is reduced from the first rotation speed to the second rotation speed. Therefore, follow-up delay with respect to a set speed as a control target does not occur in rotation of the tool change arm 40. Accordingly, there occurs no situation in which forward/backward movement of the tool change arm 40 is started at an unintended timing during rotation of the tool change arm 40. Hence, the tool change arm 40 never moves to an unintended position and therefore never interferes with another structure. On the other hand, in the case where the first difference is less than the first threshold (that is, in the case where an increase in the load on the rotation servo motor 25 is not expected), the rotational speed of the rotation servo motor 25 is maintained at the first rotation speed. Therefore, processing efficiency of the change performed by the tool change arm 40 can be maintained.

Further, in this embodiment, the first difference is obtained when the initial one of the rotations of the tool change arm 40, i.e., the swinging operation in which the tool holding parts 42, 52 are swung onto the tools T, is performed. Therefore, occurrence of follow-up delay in the rotations of the tool change arm 40 can be prevented at an early stage.

Further, in this embodiment, in the case where the second difference, which is a difference between a command value for the forward/backward movement servo motor 13 and an output value of the encoder 13b of the forward/backward movement servo motor 13, is equal to or greater than the second threshold (that is, in the case where an increase in the load on the forward/backward movement servo motor 13 is expected), the rotational speed of the forward/backward movement servo motor 13 is reduced to the second forward/backward movement speed. Therefore, follow-up delay with respect to a set speed as a control target does not occur in forward/backward movement of the tool change arm 40. Accordingly, there occurs no situation in which rotation of the tool change arm 40 is started at an unintended timing during forward/backward movement of the tool change arm 40. Hence, the tool change arm 40 never moves to an unintended position and therefore never interferes with another structure. On the other hand, in the case where the second difference is less than the second threshold (that is, in the case where an increase in the load on the forward/backward movement servo motor 13 is not expected), the rotational speed of the forward/backward movement servo motor 13 is maintained at the first forward/backward movement speed. Therefore, processing efficiency of the change performed by the tool change arm 40 can be maintained.

Further, in this embodiment, the second difference is obtained when the initial one of the forward/backward movements of the tool change arm 40, i.e., the forward movement immediately after the swinging operation, is performed. Therefore, occurrence of follow-up delay in the forward/backward movements of the tool change arm 40 can be prevented at an early stage.

Hereinbefore, one embodiment of the present invention has been described. However, the present invention is not limited to the above-described configuration and may be implemented in other manners. The following variations can be applied to the present invention.

In the above embodiment, the holding jaws 43, 53 are configured to advance and retract so that the tools T are gripped by the holding jaws 43, 53 and the tool holding parts 42, 52. However, the present invention is not limited thereto and a gripper type tool holding part, such as so-called claws, may be employed.

In the above embodiment, the first difference and the second difference are obtained at predetermined time intervals during the tool change operation. However, the present invention is not limited thereto. A configuration is possible in which a mode, such as a difference checking mode, to be executed before the tool change operation is provided, and during the mode, the first difference and the second difference are obtained and the rotational speed of the rotation servo motor 25 and the rotational speed of the forward/backward movement servo motor 13 are set.

Further, in the above embodiment, the controller for the machine tool, the controller for the tool magazine, and the controller 60 for the tool changer 10 are provided separately. However, the present invention is not limited thereto and the above three controllers may be integrated.

Furthermore, in the above embodiment, a so-called vertical machining center is provided as an example of the machine tool to which the tool changer 10 can be applied. However, the present invention is not limited thereto and can be preferably applied to, for example, a horizontal machining center, a combined NC lathe that is capable of turning and milling, or the like.

REFERENCE SIGNS LIST

1 Machine tool
5 Spindle
10 Tool changer
11 Housing
12 Forward/backward movement mechanism
13 Forward/backward movement servo motor
13b Encoder
19 Holding member
24 Rotation mechanism
25 Rotation servo motor
25b Encoder
40 Tool change arm
42 Tool holding part
52 Tool holding part
60 Controller
61 Threshold storage (Storage)
T Tool

The invention claimed is:

1. A tool changer disposed at a tool change position in a machine tool and changing a tool attached to a spindle with a next tool positioned at a standby position, the tool changer comprising:
a holding member disposed to have a center axis parallel to an axis of the spindle, and provided to be rotatable about the center axis and movable in a direction along the axis of the spindle;
a rotation mechanism including a rotation servo motor and rotating the holding member at a first rotation speed in normal and reverse directions about the center axis, the rotation servo motor having an encoder;
a forward/backward movement mechanism including a forward/backward movement servo motor and moving the holding member forward and backward at a first forward/backward movement speed in the direction along the axis of the spindle, the forward/backward movement servo motor having an encoder;
at least one tool change arm disposed on the holding member to extend in a radial direction of the holding member and holding the tools such that axes of the tools are parallel to the center axis of the holding member;
a storage having a first threshold previously stored therein; and
a controller calculating a first difference as a difference between a command value for the rotation servo motor and an output value of the encoder of the rotation servo motor and comparing the first difference with the first threshold, in a case where the first difference is equal to or greater than the first threshold, changing a rotational speed of the holding member rotated by the rotation mechanism to a second rotation speed slower than the first rotation speed, and in a case where the first difference is less than the first threshold, maintaining the rotational speed of the holding member rotated by the rotation mechanism at the first rotation speed.

2. The tool changer according to claim 1, wherein the first difference is calculated when an initial one of rotations of the tool change arm in a tool change operation is performed.

3. The tool changer according to claim 2, wherein:
the storage is configured to have a second threshold previously stored therein; and the controller is configured to calculate a second difference as a difference between a command value for the forward/backward movement servo motor and an output value of the encoder of the forward/backward movement servo motor and compare the second difference with the second threshold, in a case where the second difference is equal to or greater than the second threshold, change a forward/backward moving speed of the holding member moved by the forward/backward movement mechanism to a second forward/backward movement speed slower than the first forward/backward movement speed, and in a case where the second difference is less than the second threshold, maintain the forward/backward moving speed of the holding member moved by the forward/backward movement mechanism at the first forward/backward movement speed.

4. The tool changer according to claim 3, wherein the second difference is calculated when an initial one of forward/backward movements of the tool change arm in a tool change operation is performed.

5. The tool changer according to claim 1, wherein:
the storage is configured to have a second threshold previously stored therein; and
the controller is configured to calculate a second difference as a difference between a command value for the forward/backward movement servo motor and an output value of the encoder of the forward/backward movement servo motor and compare the second difference with the second threshold, in a case where the second difference is equal to or greater than the second threshold, change a forward/backward moving speed of the holding member moved by the forward/backward movement mechanism to a second forward/backward movement speed slower than the first forward/backward movement speed, and in a case where the second difference is less than the second threshold, maintain the forward/backward moving speed of the holding member moved by the forward/backward movement mechanism at the first forward/backward movement speed.

6. The tool changer according to claim 5, wherein the second difference is calculated when an initial one of forward/backward movements of the tool change arm in a tool change operation is performed.

* * * * *